United States Patent [19]

Maeda et al.

[11] Patent Number: 5,420,845
[45] Date of Patent: May 30, 1995

[54] METHODS OF VARYING OPTICAL PROPERTIES, OPTICAL DEVICES, INFORMATION RECORDING MEDIA AND INFORMATION RECORDING METHODS AND APPARATUSES

[75] Inventors: Yoshihito Maeda, Mito; Isao Ikuta, Iwaki; Masaichi Nagai, Hitachi; Yoshimi Kato, Takahagi; Hisashi Andoh, Hitachi; Nobuo Tsukamoto, Katsuta, all of Japan

[73] Assignee: Hitachi, Ltd., Tokyo, Japan

[21] Appl. No.: 900,497

[22] Filed: Jun. 18, 1992

[30] Foreign Application Priority Data

Jun. 20, 1991 [JP] Japan ................. 3-148399

[51] Int. Cl.⁶ .................................................. G11B 7/24
[52] U.S. Cl. ..................... 369/100; 369/275.1; 369/284; 369/288; 346/135.1; 430/945
[58] Field of Search ............ 369/100, 108, 126, 272, 369/275.1, 275.2, 283, 284, 288, 286, 292; 346/76 L, 135.1; 430/945, 495

[56] References Cited

U.S. PATENT DOCUMENTS

| | | | |
|---|---|---|---|
| 4,425,570 | 1/1984 | Bell et al. | 346/135.1 |
| 4,703,469 | 10/1987 | Pettigrew et al. | 369/101 |
| 4,757,492 | 7/1988 | Fukushima et al. | 369/100 |
| 4,969,141 | 11/1990 | Takaoka et al. | 360/100 |
| 5,103,284 | 4/1992 | Ovshinsky et al. | 357/60 |

FOREIGN PATENT DOCUMENTS

| | | | |
|---|---|---|---|
| 173523 | 3/1986 | European Pat. Off. | G11B 7/24 |
| 425278 | 5/1991 | European Pat. Off. | G11B 7/00 |
| 2507805 | 1/1982 | France | |
| 2001830 | 8/1990 | Japan | G02F 1/35 |
| 3065930 | 3/1991 | Japan | G02F 1/35 |

OTHER PUBLICATIONS

A. I. Ekimov, et al., "Quantum Size Effect in Semiconductor Microcrystals", Solid State Communications, vol. 56, No. 11, 1985, pp. 921–924.
U.S. Pat. No. 4,101,976 365/119, Jul. 1978.
Document, "Solid State Communication" vol. 56, No. 11, pp. 921–924 (1985).
Document "Oyo Butsuri" vol. 55, No. 3, pp. 325–335 (1990) (no translation).

*Primary Examiner*—Paul M. Dzierzynski
*Assistant Examiner*—James Beyer
*Attorney, Agent, or Firm*—Antonelli, Terry, Stout & Kraus

[57] ABSTRACT

High density optical information recording even at room temperature is achieved by control of the diameter of crystalline portions exhibiting quantum size effects of fine semiconductor particles distributed in a dielectric matrix, using the non-crystalline to crystalline phase transition of the fine particles. The quantum size effects mean that the optical properties of the medium depend on the diameter of the crystalline portions. Various methods of recording, reproducing and erasing information using this optical recording medium are possible. The invention is applicable to other optical devices.

27 Claims, 7 Drawing Sheets

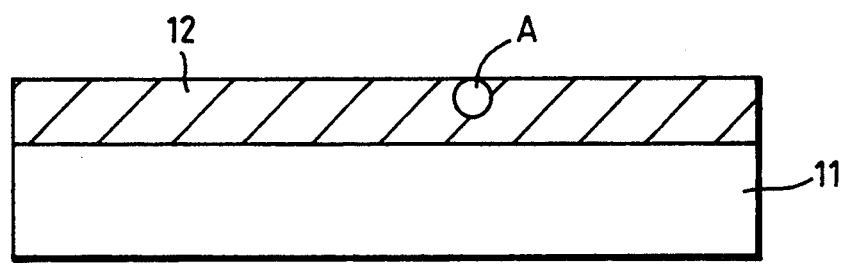
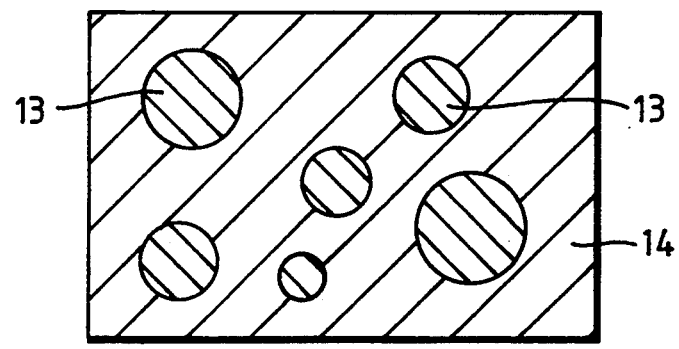

Wavelength

Wavelength

METHODS OF VARYING OPTICAL PROPERTIES, OPTICAL DEVICES, INFORMATION RECORDING MEDIA AND INFORMATION RECORDING METHODS AND APPARATUSES

BACKGROUND OF THE INVENTION

1. Field of the Invention

This invention relates to a method of varying or selecting optical properties of a body, and to various applications of the method, such as control of optical devices, information recording media and methods and apparatus for recording, erasing and reproducing information.

2. Description of the Prior Art

One technique for providing a high density of optical recording is the method of "photochemical hole burning" (hereinafter referred to as PHB) as described in U.S. Pat. No. 4,101,976, in which wavelength multiplexing recording is performed using the optical transition levels of the electron systems of organic pigment compounds and changes in the absorption band.

The materials normally used in PHB are quinizarin, pthalocyanine, porphyrin, etc., as the guest materials which are distributed in a transparent host material in the medium structure. These materials have to be cooled to the temperature of liquid helium in order to function as a PHB optical recording medium. In addition, when using PHB for optical recording there is a bleaching effect on the pigment itself by the light that is used for reading the absorbing holes which reduces the number of times the information can be read out.

Research of the physics of glasses with semiconductor fine particles has been described in "Solid State Communication", Volume 56, p. 921 (1985).

The optical non-linear response of semiconductor fine particles has been described in "Oyo Butsuri" (Japanese), Volume 55, No. 3, pp. 325-335 (1990).

Neither of these two articles describes the effect of phase changes in such semiconductor fine particles.

SUMMARY OF THE INVENTION

An object of the present invention is to provide a recording medium that has high recording density that can permit recording and reproduction preferably at room temperatures, together with associated methods and apparatus.

More generally, it is an object of the invention to provide novel methods and devices for varying optical properties of a body.

In its broadest aspect, the present invention provides a method of varying the optical properties of a body. The body has fine semiconductor particles distributed in a matrix. The method comprises the step of applying to said body energy which changes the size of crystalline partial regions of said particles, which partial regions are of a size exhibiting quantum size effects. Due to the quantum size effects, which are explained more below, the optical properties, in particular the optical absorption spectrum is dependent on the size of the crystalline regions of the particles, and also the size distribution. The invention makes use of the size distribution to be found in such a population of particles.

Thus the invention can also provide a method of providing control of an optical device, e.g. for the purpose of information storage. The device has a body which contains fine semiconductor particles distributed in a matrix, the particles being made of a material capable of existing in both amorphous and crystalline states at the operating temperature of the device. The control is performed by applying energy to the body so as to vary the ratio of the relative amounts of amorphous and crystalline regions in the particles, the crystalline regions being of a size exhibiting quantum size effects.

Further the invention provides a method of data storage comprising the step of varying the optical properties of a body in dependence on the data being stored, said body having fine semiconductor particles distributed in a matrix. The step of varying the optical properties is performed by irradiating the body with light energy which changes the amount, in the semiconductor particles, of crystalline partial regions thereof of a size having quantum size effects. The initial or erased state may be one in which the crystalline partial regions are absent.

The invention also provides a method of data storage comprising selecting, in accordance with the data stored, optical absorption frequency spectra of a recording material having an absorption frequency spectrum which is variable by control of the optical fundamental absorption energy of fine semiconductor particles embedded in a matrix.

The invention is not limited to information recording. Broadly it provides an optical device having
  (a) a body whose optical properties are variable, the body having fine particles of semiconductor material distributed in a matrix, the particles being capable of existing in a state of containing within them crystalline partial regions of the semiconductor material, which crystalline regions are of a size exhibiting quantum size effects, and
  (b) means for applying energy to the particles so as to vary the size of the crystalline partial regions.

The invention further provides an optical device having controllable optical properties, comprising:
  (a) a body whose optical properties are variable, the body having fine semiconductor particles distributed in a matrix which particles are of a material capable of existing in both an amorphous state and a crystalline state, and
  (b) means for controlling the optical properties of the body comprising means for applying energy to said body of intensity sufficient to vary the ratio of the relative amounts of amorphous and crystalline regions of the particles, which crystalline regions exhibit quantum size effects.

The recording medium of the present invention is one having a recording layer on a substrate, and is characterized in that the recording layer has a matrix material in which are dispersed semiconductor fine particles having a size distribution and capable of providing crystalline regions exhibiting quantum size effects. Here, it is sufficient if the substrate can hold the matrix material formed on it, and the presence or absence of transmittivity to the light used can be selected appropriately depending on the mode of use. For example the substrate may be reflecting.

The matrix is typically dielectric and transmissive of light used to effect recording, erasing and reproduction of information. The matrix may be for example glassy or crystalline.

The size distribution of the particles should preferably be one in which it is possible to determine the statistical average value and can be, for example, Gaussian distribution, Lorentz distribution, or any other suitable distribution. Fine structure of the optical absorption spectrum of the particles arises from deviations from e.g. a Gaussian distribution. Uniform dispersion of the particles in the matrix is highly desirable.

The thickness of the matrix layer is not thought to be critical. Suitably it may be less than 10 µm. The thickness may be determined by requirements of the manufacturing process.

In addition, the recording medium of the present invention comprises a recording layer on a substrate and this recording layer has the characteristics that it is made of a non-crystalline matrix which has dispersed inside it semiconductor fine particles whose optical fundamental absorption energy can be controlled. The film thickness of the recording layer may suitably be optimized so that the optical interference occurring in the medium can be utilized relative to the light used for recording, reproducing, and erasing the information, and an optimal optical interference range is present depending on the device or application for which the apparatus is used and hence can be selected appropriately.

In addition, the recording medium of the present invention comprises a recording layer on a substrate and this recording layer has the characteristics that it is made of a preferably non-crystalline matrix (base material) which has dispersed inside it fine particles. The matrix material is a substance that has a wider band gap than the semiconductor material of the particles, i.e. a lower electron affinity energy than the particles. The size of the particles should preferably be such that their radius is less than three times or less than two times the effective Bohr radius, and the particles having such radii should preferably be more than 80%, even more preferably, more than 90% of the total number of particles. However, even this relationship can be optimized depending on the different uses of the devices. Further, the sizes of the particles should preferably be more than the typical size of the nuclei for microcrystal formation.

Preferably, the fine semiconductor particles have an average size of not more than 10 nm. The particles preferably have a size distribution ($\sigma$) expressed in nm such that $0.5 \leq \sigma \leq 3$. More preferably $1 \leq \sigma \leq 2$. Suitably the particles of semiconductor material are capable of conversion by light energy between an amorphous state and the state of containing crystalline partial regions.

The semiconductor fine particles are preferably made of germanium, silicon, tellurium or selenium and the matrix may be a non-crystalline dielectric material, preferably of silicon dioxide or germanium oxide. Other materials which may be used are discussed below. The matrix is preferably formed of a material having a solid solubility for said semiconductor material of at most 5 atomic %.

The volume of the particles in said matrix is preferably in the range 10 to 60% of the total volume of the matrix.

Further, the present invention may provide a recording medium comprising a dielectric material film formed on a substrate and having dispersed in it semiconductor fine particles with a size distribution and has the feature that the radius of the crystalline portion formed inside the semiconductor ultra-fine particles by the application of energy from the outside can be varied to a value less than the effective Bohr radius of the exciton generated within the semiconductor particles thereby recording information.

The energy used in the invention to change the state of the fine particles, can be, for example, light (including IR radiation), electrical energy, magnetic energy, pressure, etc. Preferably, a dye laser is used and may have an energy density sufficient to cause phase change of the semiconductor particles. Higher energy lasers such as a Nd/YAG (yttria alumina garnet) laser or a $N_2$-gas laser may be employed. In use of a laser, for example, the energy (joules) is determined by the product of the power (watts) and the time duration (seconds), and it is preferable that the recording energy is larger than the reproduction energy and that the erasing energy is larger than the recording energy.

One method of recording information according to the invention comprises the steps of (a) applying a first energy to a recording layer comprising a matrix in which are dispersed fine particles of semiconductor material capable of existing in a non-crystalline state and a crystalline state so as to bring the said particles into said non-crystalline state and (b) forming regions of said crystalline state exhibiting quantum size effects inside said particles by at least one application of a second energy which is smaller than the said first energy, said application of said second energy being controlled in dependence on the information to be recorded.

Another method of recording information according to the invention comprises the step of applying, at least once, energy to a recording layer comprising a dielectric matrix material in which are dispersed fine semiconductor particles in a non-crystalline state, so as to form crystalline regions exhibiting quantum size effects within said particles, said energy being greater than the optical fundamental absorption energy of said particles, said application of said energy being controlled in dependence on the information to be stored.

A further method according to the invention is recording information in a recording medium having a recording layer formed on a substrate said layer having a matrix and dispersed therein semiconductor fine particles with a distribution of radii, the method comprising (a) applying energy is to bring said particles to a non-crystalline state by melting, and (b) subsequently applying energy to bring core portions of said particles to a crystalline state thereby forming crystalline regions exhibiting quantum size effects and with a distribution of radii, said step (b) being performed so as to vary the optical fundamental absorption energy of said crystalline regions in dependence on the information being stored so that information recorded corresponds to at least one absorption wavelength appearing in the optical absorption spectrum of the particles.

The invention also provides a method of erasing information recorded in a recording medium having a recording layer formed on a substrate and comprising a matrix having dispersed in it fine semiconductor particles with a distribution of radii, which particles have core regions in a crystalline state and exhibiting quantum size effects thereby storing the recorded information, said erasing method comprising applying energy to convert the said particles into a non-crystalline state thereby erasing said recorded information.

The invention also provides a method of reproducing information recorded in a recording medium having a recording layer formed on a substrate and comprising a matrix having dispersed in it fine semiconductor particles with a distribution of radii, which particles have core regions in a crystalline state and exhibiting quantum size effects thereby storing the recorded information, said reproducing method comprising detecting at least one absorption wavelength appearing in a spectrum selected from the reflection, transmission and absorption spectra of said recording layer.

This invention further provides a method of recording information in an optical recording medium comprising a recording layer formed on a substrate said layer having a matrix and dispersed therein semiconductor material fine particles having diameters greater than the effective Bohr radius of said semiconductor material and having a distribution of sizes, said recording method comprising applying energy to said recording layer so as to change the diameters of crystalline regions within said particles to less than the said effective Bohr radius so that the optical fundamental absorption energy corresponding to the radius of the said crystalline part is varied, the information recorded thus corresponding to at least one absorption wavelength appearing in the optical absorption spectrum of said layer.

Another method according to the invention comprises erasing information recorded in an optical recording medium comprising a recording layer formed on a substrate said layer having a matrix and dispersed therein semiconductor material fine particles having diameters greater than the effective Bohr radius of said semiconductor material and having a distribution of sizes, the diameters of crystalline regions within said particles being less than the said effective Bohr radius thereby storing the information, the erasing step comprising applying energy to make the diameters of said crystalline regions more than the said effective Bohr radius, thereby erasing the recorded information.

The invention also provides a method of reproducing information recorded in an optical recording medium comprising a recording layer formed on a substrate said layer having a matrix and dispersed therein semiconductor material fine particles having diameters greater than the effective Bohr radius of said semiconductor material and having a distribution of sizes, the diameters of crystalline regions within the said particles being less than said effective Bohr radius thereby storing the information, said reproducing method comprising applying radiation to said recording layer to detect at least one absorption wavelength appearing in a spectrum selected from the reflection, transmission and absorption spectra of said recording layer.

A method of recording and reproducing information according to the present invention uses the photon echo effect. In this aspect, the invention provides a method of recording and reproducing information in a recording medium having a recording layer formed on a substrate and comprising a matrix having dispersed in it semiconductor fine particles with a distribution of radii, said recording being effected by applying at least one laser pulse to bring said particles to a non-crystalline state by melting thereby initializing the recording medium, and thereafter applying at least one laser pulse to bring core portions of said particles to a crystalline state thereby forming crystalline regions exhibiting quantum size effects with a distribution of radii, thereby recording the information by varying the third order polarization of the particles which is dependent on the radii of the said crystalline regions, and said reproducing is effected by applying first, second and third excitation pulses to said recording layer at instants of times of $t_1$, $t_2$ and $t_3$ ($t_1 < t_2 < t_3$) thereby generating effectively simultaneously polarization in said crystalline regions by means of said first to third excitation pulses, and then applying a fourth excitation pulse at an instant of time $t_4$ ($t_4 > t_3$, $t_4-t_3 = t_2-t_1$) and reproducing said information by detecting change in the transmissivity of said fourth excitation pulse.

In another aspect, the invention provides information recording and reproducing apparatus comprising:
(a) an optical recording medium comprising a matrix formed on a substrate and having dispersed in it semiconductor fine particles,
(b) irradiating means for irradiating said recording medium with light that performs at least one operation of recording, reproducing, and erasing of information in said recording medium,
(c) amplification means that is located between the said optical recording medium and the said irradiating means and amplifies the spectral change in the light from the said optical recording medium, and
(d) detection means for detecting the intensity of the light from the said amplification means. Here, the amplification means is particularly effective when it is being used for the reproduction of information and it is preferable to amplify the change in the absorption spectrum of the wavelength. It is preferable to utilize the transmission or reflection of the light.

The invention also provides an information recording and reproducing apparatus comprising:
(a) a recording medium comprising a matrix formed on a substrate and having dispersed in it semiconductor fine particles,
(b) a Fabry-Perot optical resonator having at least two mirrors that partially transmit light in a wavelength range of light that performs at least one of the operations of recording, reproducing and erasing of information in said optical recording medium, with the said recording medium being located between said two mirrors,
(c) an optical head that transmits and focuses said light to said optical recording medium, and
(d) one of detecting means that detects the intensity of the light for reproduction in said wavelength range from said recording medium, and detecting means for detecting a temporal change in the light for reproduction from said recording medium.

The invention further provides an information recording and reproducing apparatus comprising:
(a) a recording medium comprising a matrix formed on a substrate and having dispersed in it semiconductor fine particles,
(b) a ring resonator formed by a partially transmitting mirror located so that it receives light from said first fully reflecting mirror and a first fully reflecting mirror, which are placed on opposite sides of said optical recording medium, a second fully reflecting mirror and a third fully reflecting mirror located so that it receives light from said second fully reflecting mirror and directs that light to the said partially transmitting mirror,
(c) an optical head that transmits and focuses light to said optical recording medium, and
(d) one of detecting means that detects the intensity of the light for reproduction from said recording medium and detection means for detecting temporal change in light for reproduction from said recording medium.

The resonator is an interferometer and functions as an optical amplifier. In particular, the ring resonator may include the computation functions.

The invention further consists in an apparatus for recording information having:
(a) a recording medium comprising a substrate and a recording layer thereon, said recording layer having a matrix and fine particles of a semiconductor material distributed in said matrix, said particles being capable of existing in a state in which they contain crystalline regions of said semiconductor material of a size exhibiting quantum size effects, and
(b) means for controlledly irradiating said recording medium with light of intensity sufficient to cause at least one of formation and change of said crystalline regions in said particles, thereby recording information in said recording medium the apparatus may further have reproducing means for the recorded information comprising means for detecting at least one optical absorption wavelength of said recording medium.

In addition to the recording of information, the present invention can also be applied to other optical devices such as filters, display devices, optical switches, solid state lasers, optical modulators, pressure sensors, light emitting devices, non-linear optical devices, optical operational devices, etc. The invention can permit active control of the optical properties of such devices.

BRIEF INTRODUCTION OF THE DRAWINGS

Embodiments of the invention will now be described by way of non-limitative example with reference to the accompanying drawings, in which:

FIG. 1A shows diagrammatically the construction of an optical recording medium embodying the invention, and FIG. 1B shows an enlarged portion A of FIG. 1A;

DESCRIPTION OF THE PREFERRED EMBODIMENTS

Figure 2A:
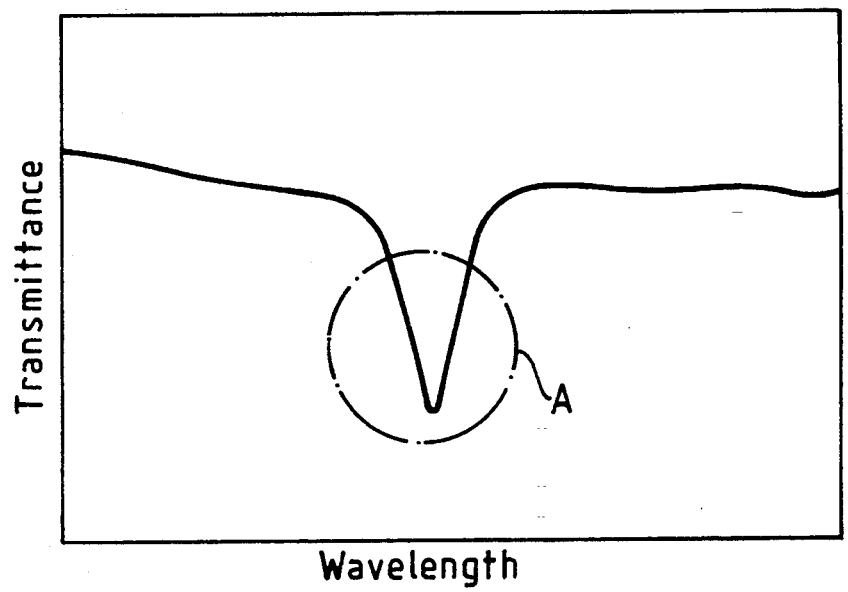
FIG. 2A shows a transmittance spectrum of a recording medium of the invention and FIG. 2B shows an enlarged portion A of FIG. 2A.

A basic structure of the recording medium in the present invention comprises, as is shown in one embodiment in FIG. 1, of semiconductor doped glass 12 formed on the substrate 11 with the said semiconductor doped glass 12 comprising the semiconductor fine ultra-fine particles 13 (here also called "ultra-fine") embedded within a dielectric material or glass (in the glassy state) 14 that has a larger band gap than the band gap of the ultra-fine particles.

The radius of semiconductor crystal regions at which the quantum size effects appear is less than the effective Bohr radius a of the excitons formed within the ultra-fine particles by the irradiation with a laser having an energy greater than the energy Eg of the optical fundamental absorption energy of the semiconductor ultra-fine particles being used.

The Bohr radius a is given by the following equation:

$$a = (h/2\pi e)^2 \epsilon (1/me + 1/mh) \qquad \text{Equation 1}$$

where, h is Planck's constant of the crystals, e is the electronic charge, $\epsilon$ is the optical dielectric constant, me is the effective mass of the electrons, and mh is the effective mass of the holes.

The state of the ultra-fine particles used according to the present invention can be observed using a transmission electron microscope, and it is also possible to determine the state of the distribution of the ultra-fine particles within the matrix using the same method.

The present invention was based on the discovery that extremely small germanium ultra-fine crystals emit light at room temperature at wavelengths from yellowish green to red color (visible light at room temperature).

The world of electrons is governed by the rules of quantum mechanics. According to these rules, in the case of crystals of less than about 10 nm (that is, quantum sizes), it is possible to observe different characteristics or new phenomena not found in the normal bulk crystals.

In this context, the inventors of the present invention tried a new approach using the separating phenomenon of ultra-fine crystals for the preparation of three dimensional quantum wells (the state in which electrons are enclosed in a very small region).

In one preparation process, for example, germanium and silicon dioxide are radio frequency sputtered simultaneously in an argon gas environment, thereby creating a state in which non-crystalline silicon dioxide and non-crystalline germanium are in solid solution. When this is heat treated, it is possible to separate out ultra-fine crystals of germanium within the non-crystalline silicon dioxide without defects. It was understood by observation in an ultra-high resolution electron microscope that these were spherical shaped totally crystalline germanium particles of diameters of less than 10 nm embedded in a dielectric material of non-crystalline silicon dioxide. These can be said to be three dimensional quantum wells prepared by the natural phenomenon of separation.

Germanium is a Group IV element like silicon and is an indirect band gap semiconductor that does not emit light optically. However, it was found that the semiconductor ultra-fine crystals without defects embedded within a dielectric material of silicon dioxide strongly emit light at room temperature in the wavelength range of 560 to 600 nm (corresponding to the colors from yellowish green to red) during photoluminescence measurements (light generation due to optical excitation). In addition, it was also observed that the wavelength of the peak of this light emission varies depending on the diameter of the ultra-fine crystals of germanium. From this light emission phenomenon that cannot be conceived according to the conventional knowledge, it was possible to determine that the ultra-fine germanium crystals separated within silicon dioxide can function sufficiently as a three dimensional quantum well.

This phenomenon of light emission by germanium ultra-fine crystals can be thought of as a new phenomenon brought about by the three dimensional quantum effects. In such three dimensional quantum systems, there are the possibilities of finding as yet unknown new phenomena that are different from the conventional bulk crystals, and can be considered to hold the key to quantum devices based on new principles.

In germanium ultra-fine crystals, it is possible to generate light emission of shorter wavelengths than that of silicon, because of the electronic characteristics of germanium (such as the energy of electrons, the effective mass, etc.). In addition, germanium can be said to be a more promising material for quantum devices because of the features of the germanium quantum system such as having higher electron mobility than silicon, etc.

The principles of operation of the present invention are described below step by step.

The quantum size effects of the semiconductor-doped glass 12 of FIG. 1 are explained below. When the magnitude of the potential generated by the dielectric or glass 14 is infinite, the electron state of the semiconductor ultra-fine particle 13 that is embedded can be considered to be three dimensional quantum confinement. If we assume that on an average, the ultra-fine particle that is embedded has a spherical shape, the electron level E (1, n) is given by the following equation $$E(1, n) = Eg + h^2 / (8\pi^2 \mu R^2) \phi(1, n)^2 \qquad \text{Equation 2}$$

Here, Eg is the energy band gap of the bulk crystal, R is the radius of the ultra-fine particle, h is Planck's constant, $\mu$ is the equivalent mass ($1/\mu = 1/me + 1/mh$, where me is the effective mass of the electrons and mh is the effective mass of the holes), $\phi(1, n)$ are the eigenvalues of Bessel's functions, and the lowest state eigenvalue $\phi(0, 1)$ is $\pi$.

From this equation, it is evident that the minimum energy shifts towards the high energy side as the radius R of the ultra-fine particle becomes smaller. When a light beam of energy greater than that corresponding to the band gap of the semiconductor is impinged on the semiconductor, the highest energy electrons in the valence electron band get excited thereby generating an exciton that is a pair of the excited electron and the corresponding hole. Such an exciton can move freely within the crystal structure due to the translational symmetry. This is due to the nature of development of the wave function $W(k, t) = u(k) \exp(-ikR - i\omega t)$ and the Bloch function u (k). Such excitons are called Wannier excitons. The generation and extinction of excitons depends on the dipole moment between the electron levels that are transited. The dipole moment Pn of transition is given by the following equation $$Pn = 1/\pi (2R/a)^{3/2} / n \mu(c, v), (n=1,2...) \qquad \text{Equation 3}$$

Here, $\mu$ (c, v) is the interband transition dipole moment, n is the major quantum number and a is the effective Bohr radius of the exciton. From this equation, it is evident that the change in the dipole moment of the transition $n=1\rightarrow2$ from the minimum energy state to the first excited state is large. Further, it is also evident that the intensity of the transition becomes larger as the ratio of the diameter to the effective Bohr radius (2R/a) becomes large. As a result, the process of light absorption is basically determined by the transition from the minimum energy level E (0, 1) obtained by Equation 2 to the first excited states E (0, 2; 1, 2; −1, 2). Since E (0, 1) becomes larger as the radius R of the ultra-fine particle becomes smaller, the optical fundamental absorption energy shifts towards shorter wavelengths. This is called the Blue Shift. From the above theoretical principles, it is clear that if the radius R of the ultra-fine particles is controlled in the range in which the quantum size effects appear, it will be possible to freely shift the optical fundamental absorption energy of the semiconductor ultra-fine particles.

A principle of recording of the present invention comprises the wavelength multiplexing recording of information corresponding to the wavelength dispersion of the optical absorption spectrum. Although the principle of controlling the distribution of the radii of the semiconductor ultra-fine particles within the glass matrix is described later, if we assume that the ultra-fine particle diameter has a Gaussian distribution, the radii occurrence frequency distribution can be expressed by the following equation $$u(R, \sigma) = 1/\sqrt{2}\ \pi\sigma\exp(-(R - Rav)^2/2\sigma^2) \qquad \text{Equation 4}$$

Figure 2B:
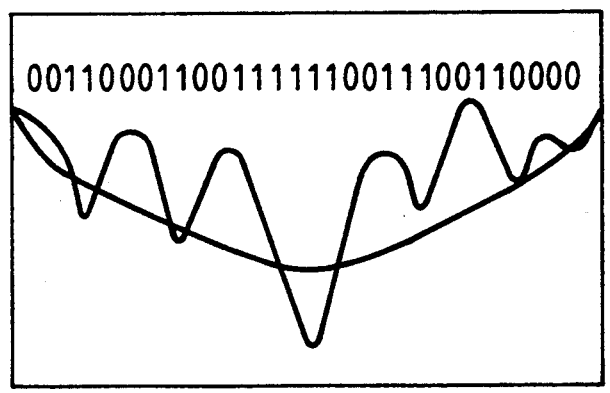

Here, Rav is the average radius and $\sigma$ is the dispersion of the radii. Thus, the radii distribution of the ultra-fine particles is reflected in the absorption spectrum. The absorption of the medium will be a distribution centered around the absorption energy E (0, 1 : Rav) corresponding to the average radius Rav, as shown in FIG. 2. Further, if we observe the minute structure of the spectrum by increasing the wavelength resolution, we can see that there are absorptions corresponding to the radii R of the different ultra-fine particles. The wavelength multiplexing recording is carried out for example by making the unit of information of the "1" bit correspond to these minute absorption bands formed in the spectrum as is shown in FIG. 2B. The detection of whether "0" or "1" is done using the method of detecting the peak wavelength of the second order differential absorption spectrum or using a detection method dependent upon the modulation method of the digital signal. It will be possible to carry out multiplexing recording over a wide wavelength range by controlling the average radius Rav of the ultra-fine particles and its dispersion.

In practical terms, it is preferable to use a semiconductor that can generate quantum size effects with a large particle radius and thus has small electron and hole effective masses resulting in a large effective Bohr radius. In such a semiconductor, since the amount of the Blue Shift of the absorption energy corresponding to the radius R of the ultra-fine particle will be large as can be seen from Equation 2, there will be the advantage that the range of recording wavelengths will be large.

The control of the radius R of the ultra-fine particles within the semiconductor-doped glass is done using the method of separating the semiconductor atoms that are present within the glass in the form of a supersaturated solid solution by annealing at a temperature at which the diffusion of the doped semiconductor atoms is easy. At this time, the particle radius R(t) is given by the theoretical equation of Lifshits—Slesov given below $$R(t)=(4/9\alpha Dt)^{\frac{1}{3}}, \quad D=D_o\exp(-Ea/kT) \qquad \text{Equation 5}$$

Here, $D_o$ is the diffusion coefficient, Ea is the diffusion activation energy of the semiconductor atoms within the glass matrix, k is the Boltzmann constant, and T is the annealing temperature.

The principle of controlling the diameters of the ultra-fine particles in the present invention is described below. Since the medium immediately after the film growth is in the state in which the semiconductor in the glass matrix is in the form of a supersaturated solid solution, the semiconductor ultra-fine particle crystals are separated in the matrix by heat treatment. The control of the particle diameter during this process is done by controlling the annealing temperature and time based on Equation 5 and uses the difference in growth of the ultra-fine particles due to the degree of supersaturation within the glass due to the different values of the annealing temperature and time duration.

The dielectric material should preferably be selected from silicon dioxide, aluminum oxide, silicon nitride, zirconium oxide, aluminum nitride, germanium oxide, yttrium oxide, hafnium oxide, sodium chloride, potassium chloride, polyethylene, polyester, polycarbonate, polymethylmethanol, or other organic resins. In addition, it is also possible to use zeolite or other porous glasses. The semiconductor material should preferably be germanium, silicon, tellurium, selenium. Other semiconductors such as lead sulfide, copper chloride, cadmium sulfide, cadmium selenide, a mixed crystal of cadmium sulfide and cadmium selenide, germanium telluride, tin telluride, indium telluride, or mixed crystals of IIIV group elements such as the gallium arsenide system, etc may be used, provided that they can be sufficiently easily converted between crystalline and amorphous states.

The combination of the two materials should preferably be such that the dielectric material does not form a solid solution with the semiconductor material that is embedded in it, or even if it forms a solid solution, it is at less than 5 at%. In addition, it is preferable that the electron affinity energy $\rho 1$ of the dielectric material is smaller than the electron affinity $\rho 2$ of the semiconductor material. It is preferable that $\rho 1-\rho 2$ is more than 0.5 eV.

The method of preparation of the recording medium of the present invention can be chosen from film growth techniques for forming the dielectric material, various types of sputtering methods, the CVD (Chemical Vapor Deposition) method, chemical plating, the solgel method, a method of impregnation into the fine pores of zeolite or other porous glasses, vacuum evaporation methods, the methods of spraying suspension liquids of organic resins, the reduction decomposition methods of nitrides or oxides, etc.

Figure 3A:
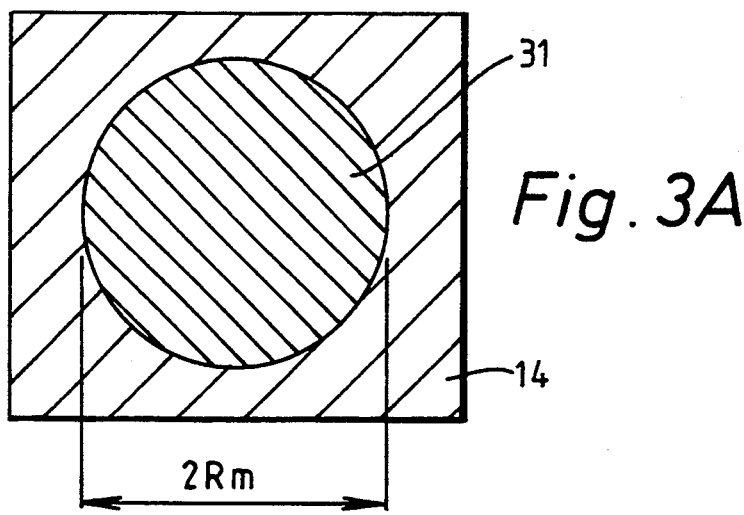
FIGS. 3A, 3B and 3C are diagrams explaining the processes of recording and erasing in an embodiment of the invention.
Figure 3B:
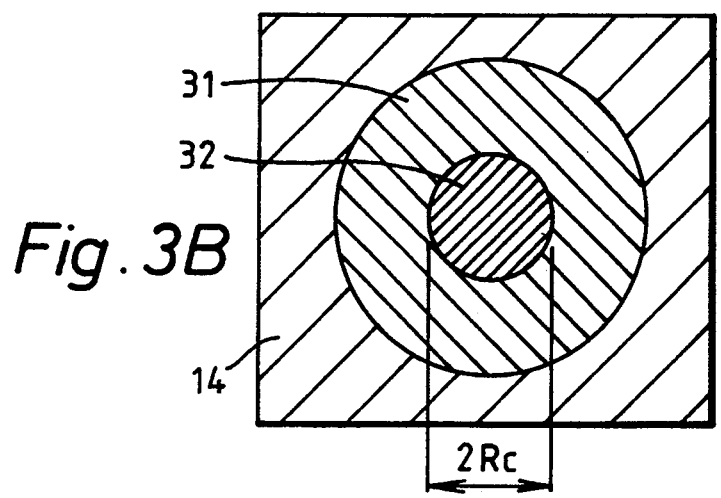
Figure 3C:
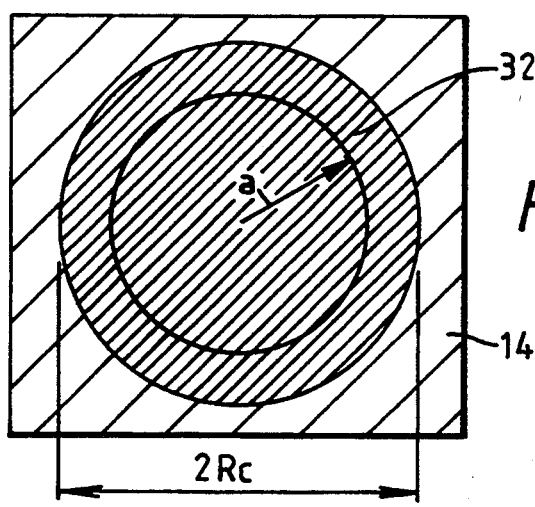

FIGS. 3A to 3C show the change in the structure in the states of recording and erasing information of one semiconductor ultra-fine particle of radius R. The erased state of the optical recording medium according to the present invention corresponds to the following two structures.

(1) The structure in which the entire interior part of the ultra-fine particle is in the non-crystalline state as is shown in FIG. 3A.
(2) The structure in which the radius Rc of the crystalline part inside the ultra-fine particle is greater than the effective Bohr radius a as is shown in FIG. 3C.

In (1), when the entire semiconductor ultra-fine particle is irradiated with a high energy laser pulse for about several pico seconds, the entire semiconductor ultra-fine particle will be heated up to several thousand degrees Centigrade so as to melt it and then it is suddenly cooled thereby taking the entire semiconductor ultra-fine particle into the non-crystalline state (see FIG. 3A). The recording is done by varying the radius Rc of the crystalline part of the ultra-fine particle. This is done by irradiating the non-crystalline ultra-fine particle with a relatively lower energy laser pulse so that the particle becomes crystalline at its center (see FIG. 3B). As a result, the ultra-fine particle will consist of a crystalline phase core 32 embedded within a non-crystalline phase 31, and the quantum size effect and the Blue Shift of the absorption energy corresponding to Rc will be the control factor necessary for recording the information.

Here, we postulate the process of crystallization of the non-crystalline ultra-fine particle due to the irradiation by the laser pulse, but the invention does not depend upon the correctness or otherwise of this assumption. Since the ultra-fine particle is considerably smaller than the wavelength of the laser beam, the energy of the laser beam will be absorbed uniformly within the particle and hence the material will be heated up to a uniform temperature, but the cooling process due to heat conduction will be considerably different at the surface and inside. The speed of cooling at the surface is larger than that at the inside. This is because the area of heat radiation is proportional to $R^2$. As a consequence, the central part can be said to be in an appropriate condition for crystallization after melting because it gets cooled slowly. Further, we suppose that since according to the theory of crystal nucleus generation and growth the crystal nucleus with the smaller surface area is more likely to grow, the nucleus will be grown more easily at the central part of the ultra-fine particle rather than at the surface. Due to this mechanism of nucleus generation, it is possible to think that the state of the ultra-fine particle in which a crystalline part with an outer sheath of non-crystalline part will be generated.

In (2) above, since the absorption is shifted to the longer wavelength side of the wavelength region where the absorption is detected by making the radius Rc of the crystalline portion greater than the effective Bohr Radius, it is possible to take the region into the apparently unrecorded state (see FIG. 3C).

Figure 4A:
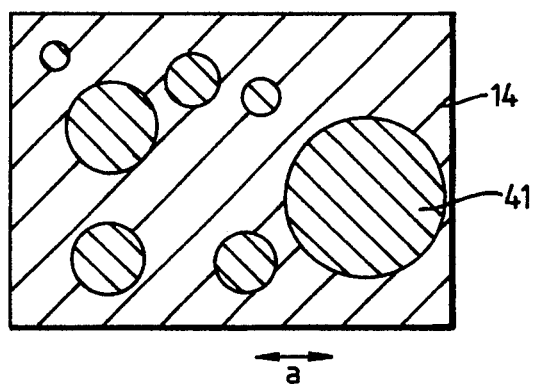
FIGS. 4A, 4B, 4C and 4D are diagrams explaining the erased states, FIGS. 4A and 4C showing the semiconductor particles in the matrix and FIGS. 4B and 4D the corresponding absorption spectra (the arrows a indicate the effective Bohr radius)
Figure 4B:
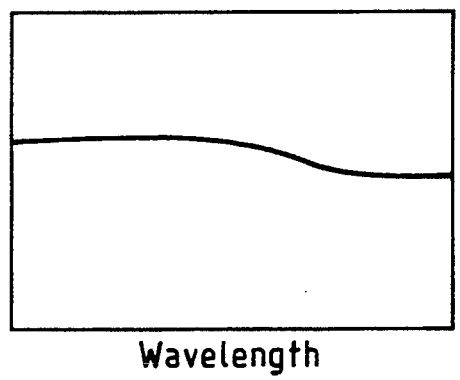
Figure 4C:
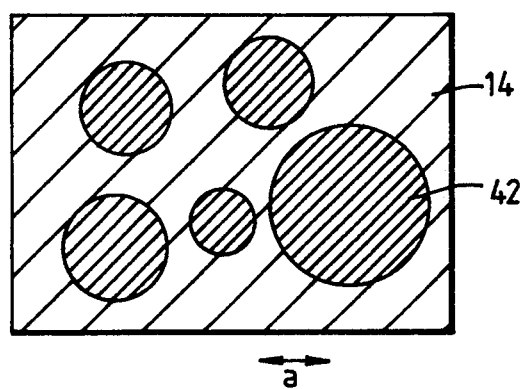
Figure 4D:
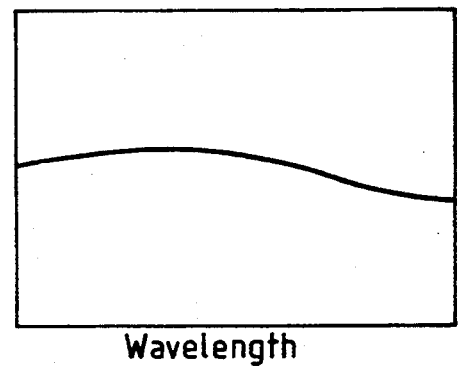
Figure 5A:
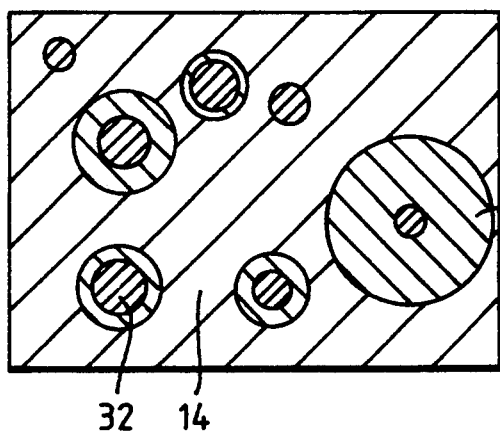
FIGS. 5A, 5B, 5C and 5D are diagrams explaining the recorded states, FIGS. 5A and 5C showing the semiconductor particles in the matrix and FIGS. 5B and 5D the corresponding absorption spectra.
Figure 5B:
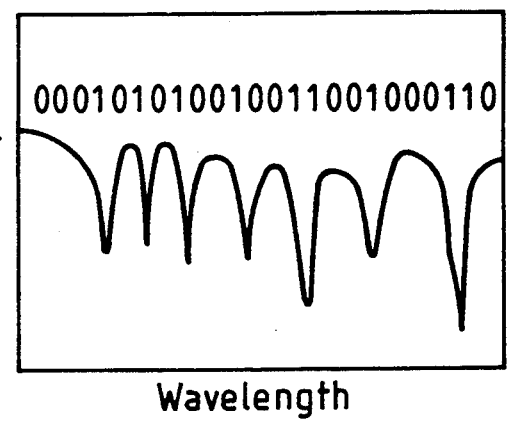
Figure 5C:
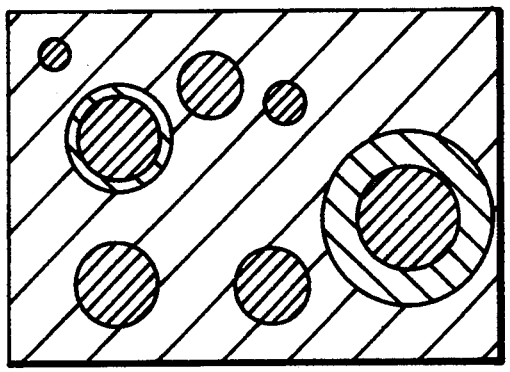
Figure 5D:
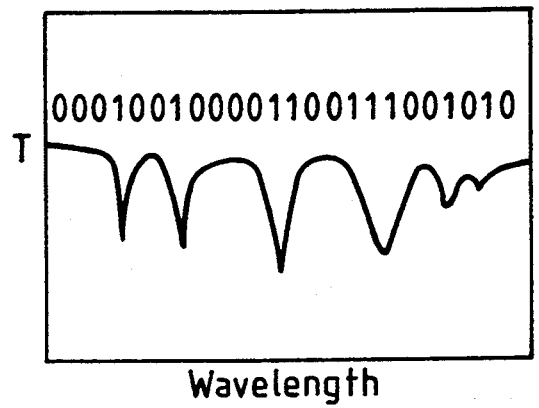

The distribution of the internal structure of the semiconductor ultra-fine particles and the change in the absorption spectrum in the unrecorded state and the erased state are shown in FIGS. 4A to 4D. In the present invention, the unrecorded state and the erased state consist of non-crystalline semiconductor ultra-fine particles 41 having radii greater than the effective Bohr radius a (as shown in FIG. 4A), or of crystalline semiconductor ultra-fine particles 42 having radii greater than the effective Bohr radius a (as shown in FIG. 4C). At this time, no absorption peak will be observed in the absorption spectrum of the detected wavelength range.

As a result, this corresponds to the unrecorded state or the erased state.

The distribution of the internal structure of the semiconductor ultra-fine particles and the change in the absorption spectrum in the two recorded states are shown in FIGS. 5A to 5D. The unrecorded state and the erased state consist of semiconductor ultra-fine particles having different radii in the non-crystalline state. According to Equation 2, the recorded state in the present invention will be determined by the radius Rc of the crystalline portion. The radius of the crystalline portion formed in the central part of the semiconductor ultra-fine particle due to the irradiation by optical energy such as a laser pulse, etc., will become smaller in the semiconductor ultra-fine particles with the larger radii. This is because the temperature at the center will be lower in the semiconductor ultra-fine particles with the larger radii. By using this phenomenon, it is possible to control to a high accuracy the distribution of the radii Rc of the crystalline portions. The method of re-writing information in the medium can be either (1) recording after returning the semiconductor ultra-fine particles to the erased state shown in FIG. 4A or FIG. 4C or (2) irradiating the recording laser pulse again to increase the radius of the crystalline portion. In method (1), there is the advantage that the range of wavelengths that is being detected can always be maintained constant. In method (2), since the diameter of the crystalline portion increases every time the information is re-written and hence the absorption position shifts towards the longer wavelength side, it may be necessary to set beforehand the range of wavelengths detected to be wide. As a result, it will be necessary to sacrifice the resolution of detection of the absorption. However, in method (2), since it will be possible to overwrite new information on old information, there is the advantage that the speed of re-writing information will be higher. It is possible to use the above two methods in combination as a system.

In the PHB method of optical recording discussed above, there was the problem of reliability under practical conditions because the operating temperature is lower than liquid nitrogen temperature. In this context, we study the operating temperature as a memory apparatus of the optical recording medium based on the principle of operation of the present invention. The recording medium of the present invention has the feature that it is physically of the zero order quantum system. As a consequence, it has the features of a zero order quantum system determined by Equation 2. In an ultra-fine particle in which the three dimensions of X, Y, and Z are all of quantum sizes, the energy of the electrons and holes will become dispersive and the state density g(E) will effectively become infinity at each energy level. The actual electron distribution is given by the product of the state density g(E) and the Fermi-Dirac statistics function f(E) which indicates the fluctuations in the distribution of the electron states due to temperature as follows.

$$f(E) = 1/(\exp((E-E_f)/kT)+1) \quad \text{Equation 6}$$

Here, Ef is the Fermi energy, k is the Boltzmann constant, and T is the temperature. Therefore, g(E) f(E) will be spread to infinity at each electron energy level En irrespective of the temperature. In actuality, a finite electron energy distribution will be obtained due to the dispersion of the electron waves in the ultra-fine particles and it is evident that the distribution is limited to an extremely narrow energy range. The feature of this zero order quantum system indicates that the recording operation in one of the recording medium in the present invention can operate at room temperature or at high temperatures because it is not affected by the fluctuations in the electron system due to temperature, and hence this is fundamentally different from the PHB which is also a wavelength multiplexing recording medium.

In the invention it is possible to use a method of recording and reproduction based on accumulated photon echo.

Photon echo is one of the third order non-linear optical effects and three optoelectric fields come into play. The macro third order non-linear polarization P will be excited in the medium due to three excitation pulses $E_1$, $E_2$, and $E_3$ irradiated at the instants of time $t_1$, $t_2$, and $t_3$, and the light radiated at the instant of time $t_3+t_2-t_1$ from this polarization is the photon echo. It is possible to detect the polarization from the change in the transimittivity of probe light passing through the medium at the fourth pulse at the instant of time $t_4$ when the polarization is excited. As a result, the relationship $t_4-t_3=t_2-t_1$ should be satisfied. Although photon echo is also observed at a low temperature near 4.2 K similar to PHB, in the recording medium of the present invention the photon echo method can operate at operating temperatures at or above room temperature. Further, in the present invention, the third order non-linear optical polarization P which is the physical cause of photon echo can be made large. The third order polarization rate $X_3$ is given by the following equation:

$$X_3 = (6\pi^2 r/R^3 h^3 (\omega-\omega_1)^3)|Pcv|^4 \quad \text{Equation 7}$$

Here, r is the rate of the occupation area of the ultra-fine particle and $\omega_1$ is the angular frequency of the exciton at the lowest energy level. From this, it is clear that the third order non-linear polarization rate increases in proportion to the $-3$ power of the diameter R of the ultra-fine particle. In this optical recording medium, as a result, it is possible to generate photon echoes of various modes by the control of the average diameter of the ultra-fine particle described above.

In the present invention therefore, an optical recording medium can be provided in which wavelength multiplexing recording and photon echo memory are possible due to the control of the average diameter of the semiconductor crystalline regions using the non-crystalline to crystalline phase transition within the ultra-fine particles due to the quantum size effect of the ultra-fine particles and irradiation with laser pulse.

EMBODIMENT 1

A film was grown on a quartz glass substrate using the rf magnetron sputtering method by covering a fixed area of an $SiO_2$ target with a Ge chip. Instead of quartz, silicon may be used as a substrate. The sputtering output was 1200 W and the Ar gas pressure was 20 mTorr. The sample so prepared was heat treated for 30 minutes at more than 800° C. in vacuum and the supersaturated solid solution of Ge within $SiO_2$ is separated thereby preparing an optical recording medium having the structure shown in FIGS. 1A and 1B. The growth of ultra-fine particles of Ge of less than 7 nm average particle diameter within the $SiO_2$ matrix due to heat treatment was confirmed by laser Raman spectroscopy.

Figure 6:
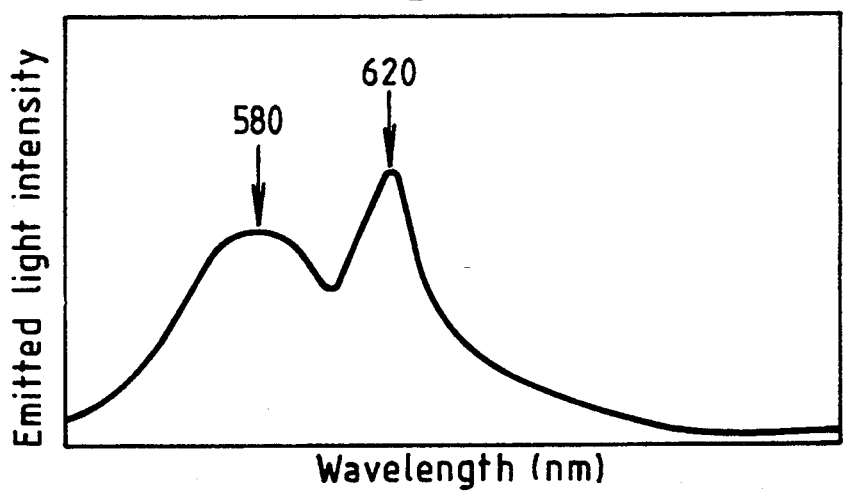
FIG. 6 shows the light emission characteristics of an embodiment of the invention.

The intensity of light emitted by photoluminescence when excited by an argon ion laser of 514.5 nm wavelength is shown in FIG. 6. The light emitted shows a sharp peak near a wavelength of 620 nm and a broad peak centered around 580 nm. This is the light emission due to the electron transitions between the quantum levels formed by the quantum size effect of the ultra-fine particles of Ge. The change in the absorption spectrum was observed by irradiating the recording medium with laser pulses of 1 ps duration with different energy densities E. No absorption was observed when E was greater than 100 kW/cm$^2$. This is because the Ge ultra-fine particles became non-crystalline due to melting. When E was about 20 kW/cm$^2$, it was observed that the absorption wavelength shifted towards the shorter wavelengths as the number of repetitions of irradiation was increased. This indicates that the absorption wavelength is dependent upon the diameter of the crystal regions of the Ge ultra-fine particles. By this embodiment of the present invention, the validity in principle of the methods of recording, reproducing, and erasing of information according to the present invention was confirmed.

With the present invention, unlike in the conventional techniques of increasing the density of optical recording by making small the recording marks themselves that are formed with sizes of several microns on the optical recording medium as the basic unit of information so as to increase the recording mark density per unit area, there is no need to reduce the wavelength of the laser used for recording nor is it necessary to increase the aperture of the objective lens that is used for focusing the laser light. Further, since it is possible to carry out wavelength multiplexing recording within the present invention, it is in principle possible to achieve recording densities of $6 \times 10^{10}$ bits per cm$^2$ of unit area of the recording medium. This means that the present invention permits high density recording of more than 600 times the recording densities of 10$^8$ bits/cm$^2$ currently possible in optical disks.

In addition, in contrast with the PHB optical recording method in which the temperature range of use is restricted to 0.3 to 25 K, the present invention can be used at or above room temperature.

In addition, the stability of the reproduced light is very good in the present invention because there is an energy threshold value for the formation of the absorption holes.

EMBODIMENT 2

A film was grown on a quartz glass substrate using the rf magnetron sputtering method by covering a fixed area of an Al$_2$O$_3$ target with a Si chip. The sputtering output was 1200 W and the Ar gas pressure was 20 mTorr. The sample so prepared was heated in portions by irradiating with a laser beam thereby separating the Si that was in the form of a supersaturated solid solution within Al$_2$O$_3$. By adjusting the power and pulse width of the laser, it was possible to control the distribution of the radii of the ultra-fine particles of Si that were grown. It was confirmed by this method that it is possible to grow ultra-fine particles of Si with radii distribution inside Al$_2$O$_3$ in the form of a matrix of unit size of several microns to several tens of microns. It was also confirmed that the optical recording medium prepared in this embodiment also had the effects similar to that in Embodiment 1.

EMBODIMENT 3

Figure 7:
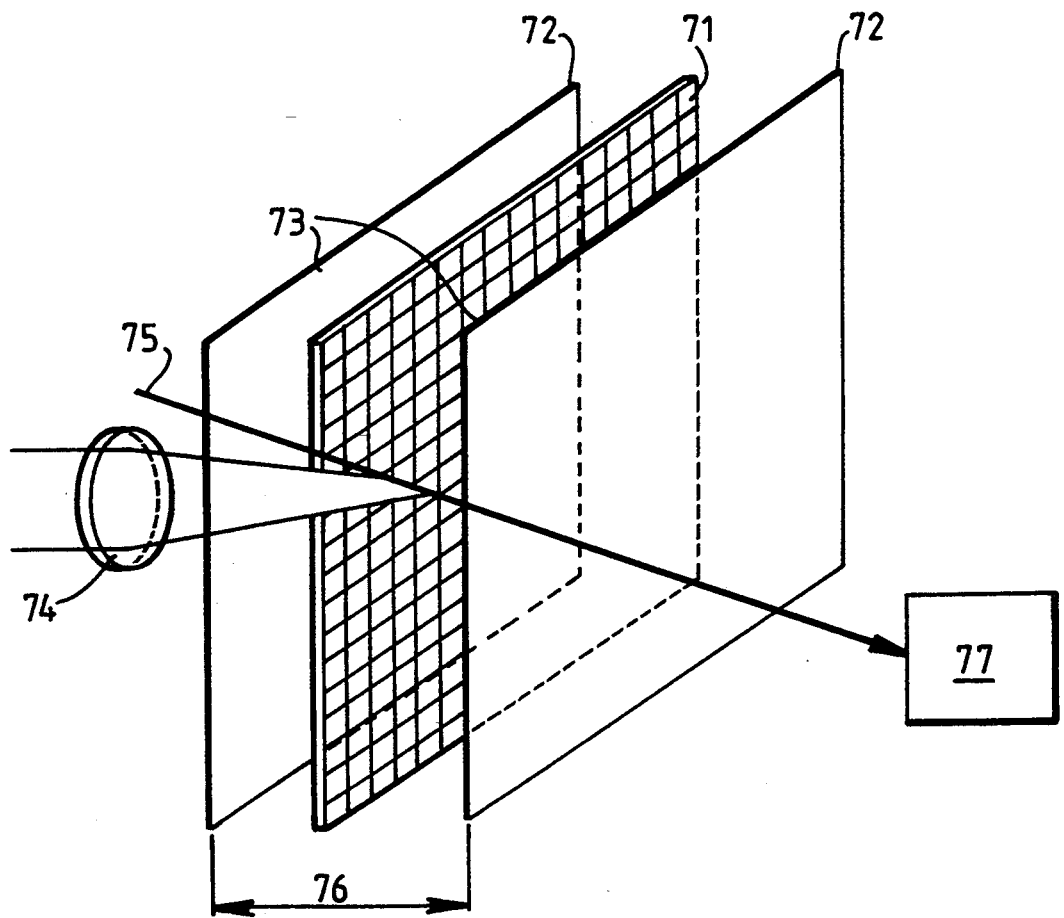
FIG. 7 is a diagrammatic view of an information recording and reproducing apparatus embodying the invention.

One of the preferred embodiments of an information recording and reproduction apparatus according to the present invention is shown in FIG. 7. The optical recording medium 71, which is as described above, has an arrangement of elements of dimensions of five microns square in the form of a matrix, with the two faces being provided with two partially transparent mirrors 72 or dielectric films having appropriate reflectivity thereby forming a Fabry-Perot resonator 73. After changing the absorption spectrum of the elements by selective irradiation with pulses of laser light as described above, the absorption peaks were detected with a high sensitivity by the detector 77 by changing the mirror spacing 76 of the Fabry-Perot resonator so that the transmittivity becomes maximum when resonated at the absorption wavelength by irradiating with a dye laser 75. In this apparatus, wavelength multiplexing recording in the optical recording medium of the present invention is possible.

EMBODIMENT 4

Figure 8:
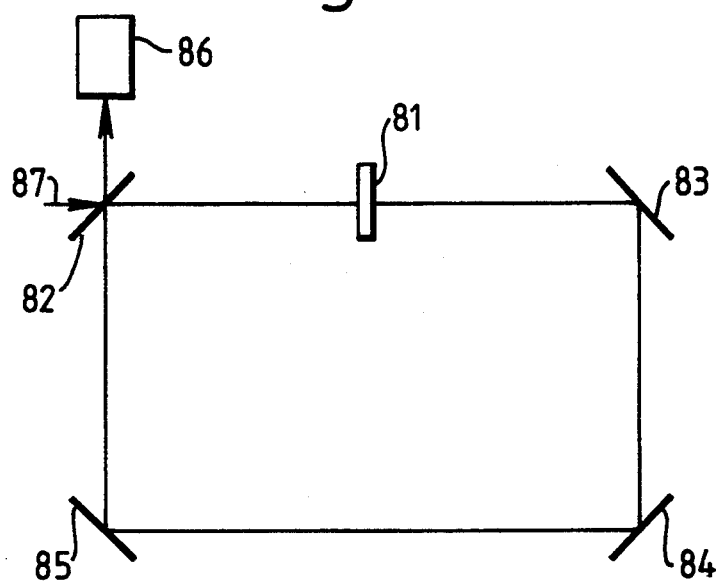
FIG. 8 is a diagrammatic view of another information recording and reproducing apparatus embodying the invention.

Another preferred embodiment of an information recording and reproduction apparatus according to the present invention is shown in FIG. 8. The optical recording medium 81 is the same as that in Embodiment 3. This apparatus comprises a ring resonator formed by a partially transmitting mirror 82 and a fully reflecting mirror 83, which are placed on opposite sides of the optical recording medium 81, and another fully reflecting mirror 84 which is placed opposite the fully reflecting mirror 83, and yet another fully reflecting mirror 85 which is placed opposite the fully reflecting mirror 84. After the absorption spectrum of the elements is changed by irradiating each of the elements of the optical recording medium 81 with a specific number of pulses of the laser beam 87 via the partially transmitting mirror 82, the dye laser 87 is irradiated again to resonate the elements at the absorption wavelength and the spacing of the ring resonator mirrors is changed to maximize the transmittivity thereby detecting the absorption peak with a high sensitivity by the detector 86. When the detection wavelength range was 400 to 600 nm, and the detector was a high speed Fourier transformation equipment, a 0.2 nm resolution of each absorption wavelength is achievable thus yielding a wavelength multiplexing level of 500 to 1000.

EMBODIMENT 5

Figure 9:
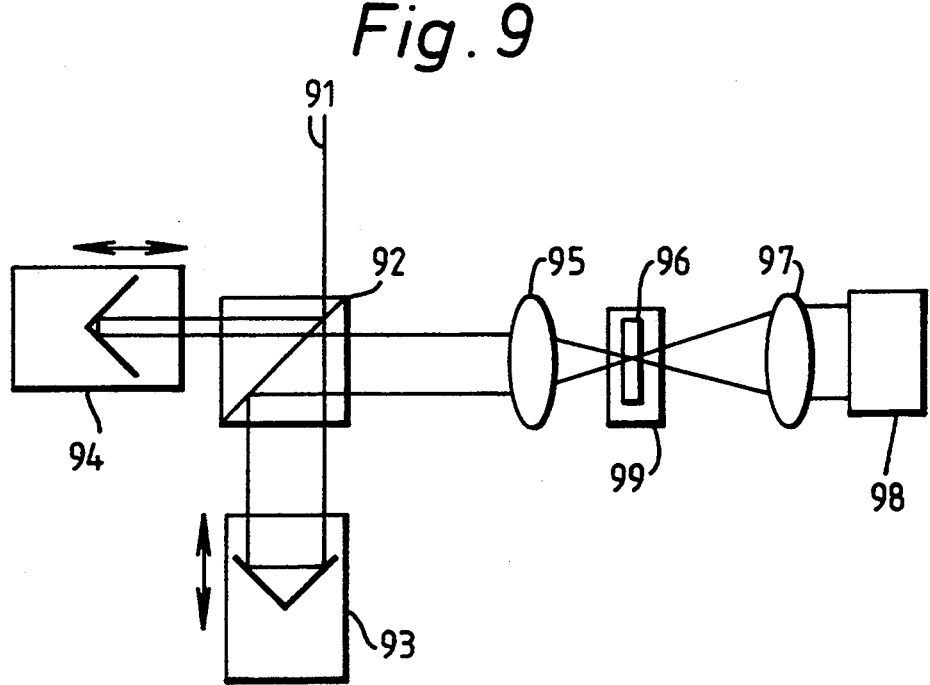
FIG. 9 is a diagrammatic view of a third information recording and reproducing apparatus embodying the invention.

Another preferred embodiment of the information reproduction apparatus based on accumulated photon echo according to the present invention is shown in FIG. 9. The recording medium 96 is as in Embodiments 3 and 4. The laser pulse 91 is divided into a pump light beam and a probe light beam by the polarization beam splitter 92. These two light beams are modulated in time respectively by the optical delay circuits 93 and 94 and are impinged on the optical recording medium 96 by the focusing optical system 95. The pump light beam and the probe light beam that pass through the optical recording medium are guided to the detector 98 by the collimator lens 97. The time difference (the phase difference) between the pump light beam and the probe light beam are detected in the detector 98 thereby detecting the occurrence of photon echo in the optical recording medium 96 on a time scale. The optical recording medium 96 has the form of a matrix as shown in FIG. 7 and the scanning of the laser pulse 91 for the elements of the matrix is done by the movement device 99.

To summarize, the invention can provide optical recording media, methods of recording, reproducing, and erasing information, and information recording and reproduction apparatus by which it is possible to operate extremely high density information recording, reproduction, and erasing at or above room temperature. The invention can be applied to other optical systems inventing control or variation of optical properties.

What is claimed is:

1. A method of varying optical properties of a body containing fine semiconductor particles distributed in a matrix, the method comprising the step of:
    applying to said body energy which changes a size of crystalline partial regions in said fine semiconductor particles, the crystalline partial regions having a maximum dimension exhibiting quantum size effects.

2. A method of controlling an optical device, the optical device including a body containing fine semiconductor particles distributed in a matrix, said fine semiconductor particles being made of a material capable of existing in both an amorphous state and a crystalline state at an operating temperature of the optical device, the method comprising the step of:
    applying energy to said body so as to vary a ratio of relative volumes of amorphous partial regions and crystalline partial regions in said fine semiconductor particles, said crystalline partial regions having a maximum dimension exhibiting quantum size effects.

3. A method of data storage comprising the step of:
    varying optical properties of a body in accordance with data to be stored;
    said body containing fine semiconductor particles distributed in a matrix; and
    said varying step being performed by irradiating said body with light energy which changes a volume of crystalline partial regions in said fine semiconductor particles, the crystalline partial regions having a maximum dimension exhibiting quantum size effects.

4. A method according to claim 3, wherein said fine semiconductor particles have a size distribution having a dispersion (a) expressed in nm such that $0.5 \leq \sigma 3$.

5. A method according to claim 3, wherein said fine semiconductor particles have an average particle size of not more than 10 nm.

6. A method according to claim 3, wherein at least 80% of said fine semiconductor particles have radii which are less than the effective Bohr radius of a material of which said fine semiconductor particles are made.

7. An optical device comprising:
    a body whose optical properties are variable, said body containing fine particles of a semiconductor material distributed in a matrix, said fine particles being capable of existing in a state in which they contain crystalline partial regions of said semiconductor material, said crystalline partial regions having a maximum dimension exhibiting quantum size effects; and
    means for applying energy to said fine particles so as to vary a size of said crystalline partial regions.

8. An optical device having controllable optical properties, comprising:
    a body whose optical properties are variable, said body containing fine semiconductor particles distributed in a matrix, said particles being made of a material capable of existing in both an amorphous state and a crystalline state; and
    means for controlling said optical properties of said body, the controlling means including means for applying to said body energy having an intensity sufficient to vary a ratio of relative volumes of amorphous partial regions and crystalline partial regions in said fine semiconductor particles, said crystalline partial regions having a maximum dimension exhibiting quantum size effects.

9. A recording medium comprising:
    a substrate; and
    a recording layer disposed on the substrate, said recording layer containing fine particles of a semiconductor material distributed in a matrix, said fine particles being capable of existing in a state in which they contain crystalline partial regions of said semiconductor material, the crystalline partial regions having a maximum dimension exhibiting quantum size effects.

10. A recording medium according to claim 9, wherein said fine particles have an average size of not more than 10 nm.

11. A recording medium according to claim 9, wherein said fine particles have a size distribution having a dispersion (a) expressed in nm such that $0.5 \leq \sigma \leq 3$.

12. A recording medium according to claim 9, wherein said fine particles are capable of being changed by light energy between an amorphous state and a state in which they contain crystalline partial regions.

13. A recording medium according to claim 9, wherein at least 80% of said fine particles have radii less than the effective Bohr radius of said semiconductor material.

14. A method of recording information comprising the step of:
    applying, at least once, energy to a recording layer, the recording layer including a dielectric matrix material in which are dispersed fine semiconductor particles initially in a non-crystalline state, so as to form crystalline partial regions having a maximum dimension exhibiting quantum size effects within said fine semiconductor particles, said energy being greater than an optical fundamental absorption energy of said fine semiconductor particles, said applying of said energy being controlled in accordance with information to be recorded.

15. A method of recording information in a recording medium having a recording layer formed on a substrate said layer having a matrix and dispersed therein semiconductor fine particles with a distribution of radii, said method comprising (a) applying energy to bring said particles to a non-crystalline state by melting, and (b) subsequently applying energy to bring core portions of said particles to a crystalline state thereby forming crystalline regions exhibiting quantum size effects and with a distribution of radii, said step (b) being performed so as to vary the optical fundamental absorption energy of said crystalline regions in dependence on the information being stored so that information recorded corresponds to at least one absorption wavelength appearing in the optical absorption spectrum of the particles.

16. A method of erasing information recorded in a recording medium having a recording layer formed on a substrate and comprising a matrix having dispersed in it fine semiconductor particles with a distribution of radii, which particles have core regions in a crystalline state and exhibiting quantum size effects thereby storing the recorded information, said erasing method comprising applying energy to convert the said particles into a non-crystalline state thereby erasing said recorded information.

17. A method of reproducing information recorded in a recording medium having a recording layer formed on a substrate and comprising a matrix having dispersed in it fine semiconductor particles with a distribution of radii, which particles have core regions in a crystalline state and exhibiting quantum size effects thereby storing the recorded information, said reproducing method comprising detecting at least one absorption wavelength appearing in a spectrum selected from the reflection, transmission and absorption spectra of said recording layer.

18. A method of recording information in an optical recording medium, the optical recording medium including a recording layer formed on a substrate, said recording layer containing fine particles of a semiconductor material dispersed in a matrix, the fine particles having radii greater than the effective Bohr radius of said semiconductor material and having a distribution of sizes, said recording method comprising the step of:
applying energy to said recording layer so as to change radii of crystalline partial regions within said fine particles to less than the effective Bohr radius so that an optical fundamental absorption energy corresponding to the radii of the crystalline partial regions is varied;
wherein recorded information corresponds to at least one absorption wavelength appearing in an optical absorption spectrum of said recording layer.

19. A method of erasing information recorded on an optical recording medium, the optical recording medium including a recording layer formed on a substrate, said recording layer containing fine particles of a semiconductor material dispersed in a matrix, the fine particles having radii greater than the effective Bohr radius of said semiconductor material and having a distribution of sizes, radii of crystalline partial regions within said fine particles being less than the effective Bohr radius, thereby representing recorded information, said method comprising the step of:
applying energy to increase the radii of said crystalline partial regions to more than the effective Bohr radius, thereby erasing the recorded information.

20. A method of reproducing information recorded in an optical recording medium comprising a recording layer formed on a substrate said layer having a matrix and dispersed therein semiconductor material fine particles having radii greater than the effective Bohr radius of said semiconductor material and having a distribution of sizes, the radii of crystalline regions within the said particles being less than said effective Bohr radius thereby storing the information, said reproducing method comprising applying radiation to said recording layer to detect at least one absorption wavelength appearing in a spectrum selected from the reflection, transmission and absorption spectra of said recording layer.

21. A method of recording and reproducing information in a recording medium having a recording layer formed on a substrate and comprising a matrix having dispersed in it semiconductor fine particles with a distribution of radii, said recording being effected by applying at least one laser pulse to bring said particles to a non-crystalline state by melting thereby initializing the recording medium, and thereafter applying at least one laser pulse to bring core portions of said particles to a crystalline state thereby forming crystalline regions exhibiting quantum size effects with a distribution of radii, thereby recording the information by varying the third order polarization of the particles which is dependent on the radii of the said crystalline regions, and said reproducing is effected by applying first, second and third excitation pulses to said recording layer at instants of times $t_1$, $t_2$ and $t_3$, wherein $t_1 < t_2 < t_3$, thereby effectively simultaneously generating polarization in said crystalline regions by means of said first to third excitation pulses, and then applying a fourth excitation pulse at an instant of time $t_4$, wherein $t_4 > t_3$ and $t_4-t_3 = t_2-t_1$, and reproducing said information by detecting a change in the transmissivity of said fourth excitation pulse.

22. An information recording and reproducing apparatus comprising:
an optical recording medium including a substrate, a matrix formed on the substrate, and fine semiconductor particles dispersed in the matrix;
irradiating means for irradiating said optical recording medium with light that performs at least one of recording, reproducing, and erasing of information on said recording medium;
resonator means located between the optical recording medium and the irradiating means for amplifying a spectral change in light from the optical recording medium; and
detecting means for detecting an intensity of light from the resonator means.

23. An information recording and reproducing apparatus comprising:
an optical recording medium including a substrate, a matrix formed on the substrate, and fine semiconductor particles dispersed in the matrix;
a Fabry-Perot optical resonator having at least two mirrors that partially transmit light in a wavelength range of light that performs at least one of recording, reproducing, and erasing of information on said optical recording medium, the optical recording medium being located between said two mirrors;
an optical head that transmits and focuses said light to said optical recording medium; and
detecting means for detecting an intensity of light for reproduction in said wavelength range received from said optical recording medium.

24. An information recording and reproducing apparatus comprising:
(a) a recording medium comprising a matrix formed on a substrate and having dispersed in it semiconductor fine particles,
(b) a ring resonator formed by a partially transmitting mirror and a first fully reflecting mirror, which are placed on opposite sides of said optical recording medium, a second fully reflecting mirror located so that it receives light from said first fully reflecting mirror and a third fully reflecting mirror located so that it receives light from said second fully reflecting mirror and directs that light to the said partially transmitting mirror,
(c) an optical head that transmits and focuses light to said optical recording medium, and (d) one of detecting means that detects an intensity of light for reproduction received from said recording medium and detecting means for detecting a change over time in light for reproduction received from said recording medium.

25. An apparatus for recording information comprising:

a recording medium including a substrate and a recording layer disposed on the substrate, said recording layer containing fine particles of a semiconductor material distributed in a matrix, said fine particles being capable of existing in a state in which they contain crystalline partial regions of said semiconductor material, the crystalline partial regions having a maximum dimension exhibiting quantum size effects; and means for controllably irradiating said recording medium with light of intensity sufficient to cause at least one of (1) formation of said crystalline partial regions in said fine particles, and (2) a change in a characteristic of said crystalline partial regions in said fine particles, thereby recording information on said recording medium.

26. An apparatus according to claim 25, further comprising reproducing means for reproducing information recorded on the recording medium, the reproducing means including means for detecting at least one optical absorption wavelength of said recording medium.

27. An information recording and reproducing apparatus comprising:

an optical recording medium including a substrate, a matrix formed on the substrate, and fine semiconductor particles dispersed in the matrix;

a Fabry-Perot optical resonator having at least two mirrors that partially transmit light in a wavelength range of light that performs at least one of recording, reproducing, and erasing of information on said optical recording medium, the optical recording medium being located between said two mirrors;

an optical head that transmits and focuses said light to said optical recording medium; and detecting means for detecting a change over time in light for reproduction received from said optical recording medium.

* * * * *